United States Patent [19]

Thompson

[11] 4,178,548

[45] Dec. 11, 1979

[54] VOICE ACTUATED MOBILE RADIO

[75] Inventor: James G. Thompson, 101 Diane Cir., Indialantic, Fla. 32903

[73] Assignees: Geraldine E. Thompson; James G. Thompson, both of Indialantic, Fla.

[21] Appl. No.: 729,163

[22] Filed: Oct. 4, 1976

[51] Int. Cl.² ............................................. H04B 1/38
[52] U.S. Cl. ........................................ 325/16; 325/22
[58] Field of Search ....................... 325/15, 16, 21–22, 325/118, 152, 361; 343/175, 180; 179/121 C, 107 BC, 106, 107 R, 121 R

[56] References Cited

U.S. PATENT DOCUMENTS

| | | | |
|---|---|---|---|
| 3,277,374 | 10/1966 | Kobayashi | 325/18 |
| 3,366,880 | 1/1968 | Driver | 325/22 |
| 3,962,553 | 6/1976 | Linder et al. | 325/22 |
| 3,971,985 | 7/1976 | Arai | 325/21 |

FOREIGN PATENT DOCUMENTS

| | | | |
|---|---|---|---|
| 740988 | 8/1966 | Canada | 325/16 |
| 291757 | 12/1931 | Italy | 179/121 C |
| 1444828 | 8/1976 | United Kingdom | 325/21 |

OTHER PUBLICATIONS

*Communications* Aug. 1975, Bottom half of p. 26.

*Primary Examiner*—Benedict V. Safourek
*Attorney, Agent, or Firm*—Duckworth, Hobby, Allen & Pettis

[57] ABSTRACT

This invention relates to a method and apparatus for operating a mobile communications transmitter/receiver type radio from a motorcycle or in another high ambient noise environment. A contact vibration transducer is provided for being coupled to the throat area of the communicator for generating a transmit audio signal responsive to the vibrations of the vocal cords talking. The transmit audio signal is then coupled to a modulator section of the communications transmitter for modulating the transmitter output. A voice operated relay is provided for switching the transmitter/receiver into and out of the transmit mode responsive to receiving the transmit audio signal from the contact vibration transducer. In this manner the transmit audio signal and the transmit/receive switching will be relatively impervious to the high ambient noise levels surrounding the communicator.

3 Claims, 3 Drawing Figures

U.S. Patent
Dec. 11, 1979
4,178,548
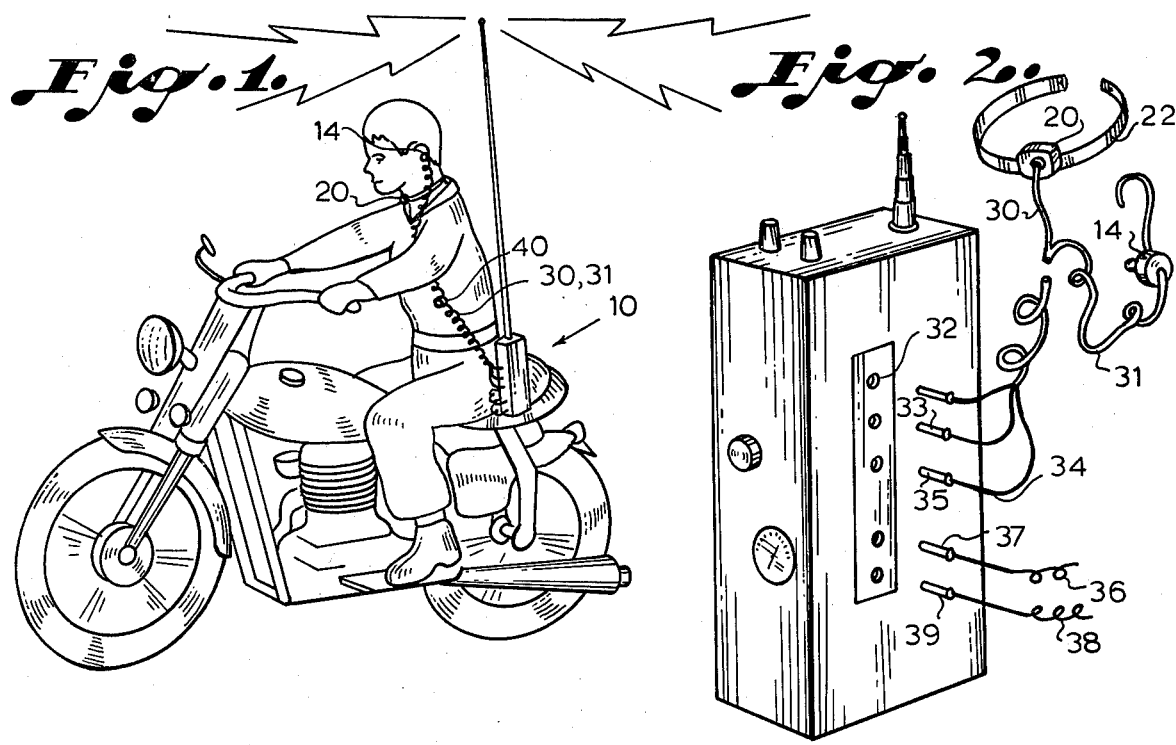
*Fig. 1.*
*Fig. 2.*
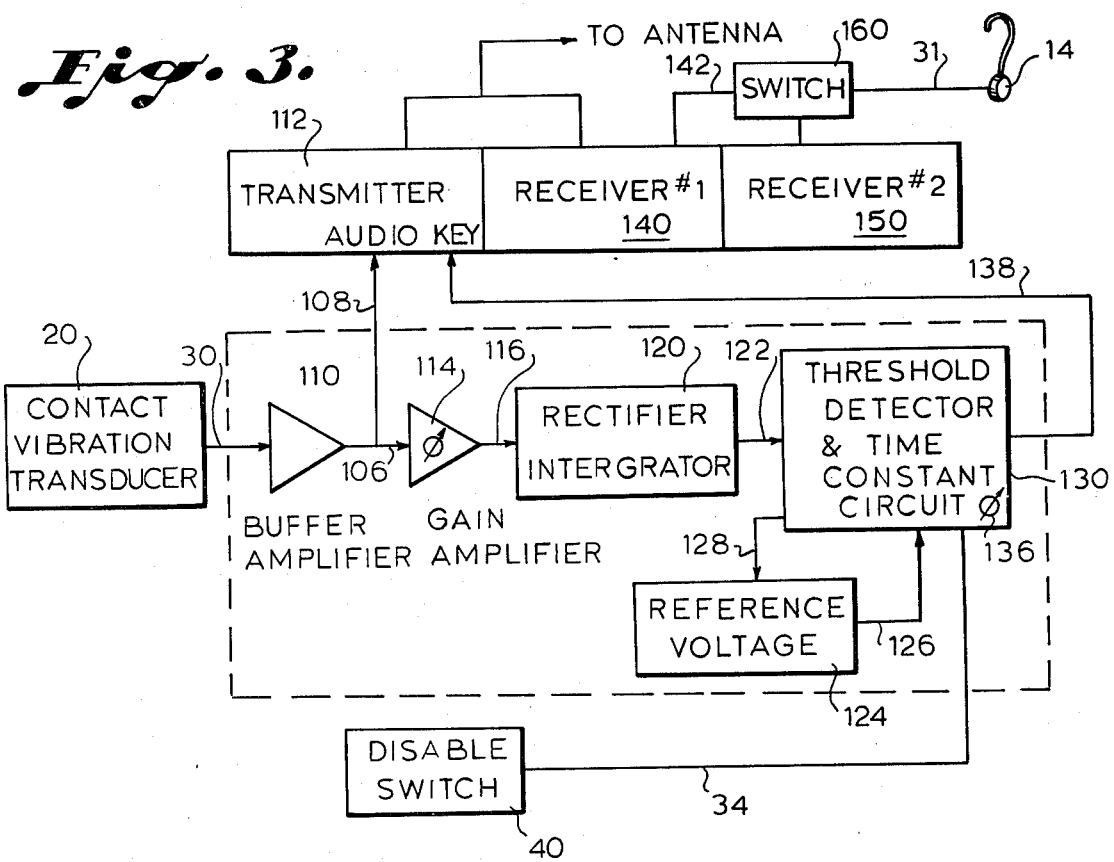
*Fig. 3.*

VOICE ACTUATED MOBILE RADIO

BACKGROUND OF THE INVENTION

1. Field of the Invention

This invention relates generally to an apparatus and method for voice actuating a radio transmitter and in particular to an apparatus and method for utilizing a contact vibration transducer for transducing the voice information.

2. Description of the Prior Art

Recent advances in the state of the art in mobile radios have enabled these time-saving devices to be utilized on a variety of different mobile vehicles. As the use of the two-way radios has become more common, businessmen and sportsmen have become more dependent upon the communications services provided by the equipment. As a result, considerable effort is now being expended to improve the efficiency of the communications process which will ultimately result in a more efficient utilization of the communications resources.

Two-way communications radios have long been used on motorcycles by public service organizations such as police, fire, etc. These two-way mobile communications transceivers generally utilize a push-to-talk system which is actuated by depressing a button on the microphone. However, this push-to-talk system has proven to be unsatisfactory for several reasons. First, the operator must grasp the microphone and the push-to-talk switch in one hand, which can be dangerous when driving the motorcycle, or other similar vehicle, during heavy or congested traffic. Other radio services have adopted a voice actuated transmit system (VOX) for keying the transmitter responsive to the voice of the operator. However, this system is not adaptable to use on motorcycles or in areas of high ambient noise levels since the unwanted noise often causes a false keying of the transmitter. Secondly, since the microphone is equally responsive to voice and noise sources, the intelligibility of the operator's voice is generally impaired due to the noise contributed by the wind or the ambient noise sources.

The prior art does not lend any useful suggestions to these problems. Cribb, in U.S. Pat. No. 3,588,359, discloses a voice operated transceiver designed to be incorporated into a protective suit. Miyachi, in U.S. Pat. No. 3,944,924, discloses a Citizens Band radio transceiver for being mounted on a motorcycle. The transceiver utilizes a standard audio type microphone transducer which is mounted upon the helmet for being located near the communicator's mouth. No automatic voice operation is provided. Van Gastle, in U.S. Pat. No. 2,490,563, discloses a system for mounting a radio upon the handle bars of motorcycles or other vehicles. Goldfus, in U.S. Pat. No. 2,980,379, discloses a detachable rack for coupling a portable radio to a mobile vehicle. Wertheimir, in U.S. Pat. No. 3,134,945, discloses a portable radio which may be used with a motor vehicle or may be detached and used as a portable radio with its self-contained power supply.

SUMMARY OF THE INVENTION

This invention relates to a method and apparatus for operating a communications transmitter/receiver under high ambient noise conditions. A contact vibration transducer is provided for being coupled to the throat area of the communicator for generating a transmit audio signal responsive to the vibrations of the vocal cords while talking. The transmit audio signal is coupled to a modulator section of the communications transmitter for modulating the transmitter output. Voice operated switching means are provided for switching the transmitter/receiver into and out of the transmit mode responsive to receiving the transmit audio signal from the contact vibration transducer. In this manner the transmit audio signal and the transmit-/receive switching will operate relatively impervious to the high ambient noise levels surrounding the communicator.

BRIEF DESCRIPTION OF THE DRAWINGS

Other objects, features and advantages of the present invention will become apparent from a study of the written description and drawings in which:

FIG. 1 illustrates an apparatus in accordance with the present invention as used by a motorcycle communicator.

FIG. 2 is a pictorial illustration of the communications transmitter/receiver for being coupled with a contact vibration transducer.

FIG. 3 is a schematic block diagram illustrating the interface electronics for controlling the operation of the communications transceiver.

DETAILED DESCRIPTION OF THE PREFERRED EMBODIMENT

A voice actuated Citizens Band mobile radio as illustrated generally as 10 in FIGS. 1 and 2. The mobile radio 10 generally comprises a single transmitter unit and a single receiver unit mechanically and electrically coupled together in a common case. The transmit and receive frequencies are generally arranged to allow communications according to a pre-established frequency plan, that is either simplex or duplex type communications. The term transceiver will hereinafter be used to describe a radio comprising transmitter and receiver sections cooperating to provide two-way communications with another compatible radio. However, it should be noted that certain elements of the present invention will operate satisfactorily with only the transmitter section of the radio without departing from the scope and spirit of the invention.

As illustrated in FIGS. 1 and 2, a contact type vibration transducer 20 is coupled to the throat area of the operator adjacent the larynx or voice box. The vibration transducer generates a transmit audio signal responsive to the vibrations of the vocal cords as the communications operator talks. The frequency response of the contact vibration transducer is generally optimized for the frequencies between 300 Hz and 3,000 Hz for providing optimum intelligibility of the communications signal while minimizing the required bandwidth thereof. While various types of contact vibration transducers are acceptable, a preferred embodiment of the present invention utilizes a capacitance type transducer. This transducer 20 is coupled to a throat strap 22 which may be lightly engaged about the neck of the rider. The sensitivity of the transducer 20 does not require tight contact between the transducer and the throat to generate a usable and intelligible signal. The output of the transducer 20 is coupled through a coiled conductor 30, an input connector 32 and into the transmitter section 112 of the transceiver 10. The transmit audio signal is then coupled through various circuits into the modulator section of the transmitter 112 for modulating the transmitted rf output of the radio. An ear transducer or earphone 14 is coupled to the ear of the operator by an electrical conductor 31 which is in turn coupled through a connector 33 into a first receiver section 140 of the transceiver 10 for reproducing the received communications audio therefrom.

A disable switch 40 is coupled by a cable 34 through a connector 35 into the communications transceiver 10. The disable switch 40 is positioned for convenient one-hand operation by the communicator. The operation of the disable switch 40 will be discussed in detail subsequently. As illustrated in FIG. 2, DC power is supplied through a cable 36 and a connector 37 into the communications transceiver 10 to supplement the power supplied by the chemical storage batteries contained therein. In this manner the power required by the communications transceiver 10 may be obtained from the electrical system of the motorcycle through the power cable 36 when the communicator is operating the transceiver. Also, a remote antenna (not shown) affixed permanently to the motorcycle may be coupled through a cable 38 and a connector 39 into the transceiver 10 as required.

As illustrated in the schematic diagram of FIG. 3, the contact vibration transducer 20 is coupled through the electrical conductor 30 into a buffer amplifier 110 for amplifying the transmit audio signal generated by the contact vibration transducer and for matching the impedance level of the transducer device. A contact type transducer is specified since generally it does not respond to wind or external noises as would a regular audio microphone transducer. The output of the buffer amplifier 110 is coupled through the circuit conductor 108 into an audio input of the transmitter section 112 of the transceiver 10. The audio input is coupled through the proper circuitry to the modulator section of the transmitter 112 for allowing the transmit audio signal to be modulated upon the carrier produced by the transmitter 112.

The output of the buffer amplifier 110 is also coupled through the circuit line 106 into an adjustable gain amplifier 114 for adjusting the level of the transmit audio signal. The output of the amplifier 114 is coupled through a circuit conductor 116 to the input of circuitry 120 for rectifying and integrating the AC transmit audio signal for producing a DC voltage therefrom. This DC voltage is coupled through a circuit conductor 122 to a first input of a threshold detector and time constant circuit 130. The output of a reference voltage source 124 is coupled through a circuit conductor 126 to a second input of the threshold detector 130. The threshold detector 130 compares the DC voltages present at the first input and the second input thereof. If the DC voltage at the first input, representative of the rectified transmit audio signal, exceeds the reference voltage source for a period of at least thirty milliseconds, then the threshold detector 130 generates a keying signal which is transmitted through the circuit conductor 138 to a key input of the transmitter 112, thereby causing the transmitter to transition from the receive to the transmit mode.

As the key signal is generated by the threshold detector circuitry 130, a signal is sent through the circuit conductor 128 to the reference voltage source 124 for reducing the output voltage therefrom. In this manner, once the threshold detector 130 senses the present of the transmit audio signal, the reference voltage is reduced for allowing the keying of the transmitter for a continuous period of time without intermittent droupouts due to low amplitude periods within the transmit audio signal. To further improve the operation of of the threshold detector 130, a delay time constant dropout is also included therewith for continuously generating the keying signal for a period of approximately one second after the DC voltage at the first input drops below the DC reference voltage at the second input. In this manner short pauses between words during the transmission will not cause the transmitter 112 to drop from the transmit mode. The time constant of the delay circuit is adjustable by varying the potentiometer 136.

The audio output of a first receiver 140 is coupled through a circuit conductor 142 into a switching circuit 160. The audio output of a second receiver 150 is coupled through a circuit conductor 152 into a second input of the switching circuit 160. Generally, the first receiver 140 will comprise a communications receiver tuned to a frequency corresponding to the communication link of the transmitter 112. The second receiver 150 will generally be a commercial broadcast type receiver for receiving voice or music signals from the low frequency or VHF broadcast bands. In this manner the switching circuit 160 may be used to select from the audio outputs of either the first or second receiver, depending on whether the operator desires to monitor the communication's link or to listen to music, etc. The received audio output is coupled through the circuit conductor 31 into the earphone 14.

The broadcast receiver 150 is included for providing an audio diversion for the motorcycle operator in much the same way that a broadcast receiver is included in most automobiles. The switching circuit 160 may be manually operated by the communicator, or in the alternative may be automatically actuated by the presence of a received audio signal from the first receiver 150 through a priority switching system. In this manner the communications audio will override the background music to allow the operator to immediately respond through the transmitter 112.

The disable switch 40 is coupled by a circuit conductor 34 to the threshold detector 130. In this manner the disable switch 40 will disable the threshold detector and time constant circuitry 130 for allowing the communicator to cough or talk without keying unnecessarily the transmitter 112.

The operation of the voice actuated mobile radio will now be illustrated with reference to FIGS. 1, 2 and 3. It will first be assumed that the communicator and motorcycle rider has coupled the contact vibration transducer 20 to the area of the throat adjacent the vocal cords by coupling the distended end of the throat straps 22 about the neck. It will also be assumed that the operator has properly attached the ear transducer 14, the disable cable 34, the power cable 36 and the remote antenna cable 38 as desired. As the operator talks, the vibrations received by the contact vibration transducer 20 will generate an electrical signal which is amplified by the buffer amplifier 110 and then fed into the modulator section of the transmitter 112. Simultaneously, the transmit audio signal will be fed through the amplifier 114, the rectifier-integrator 120 and the threshold detector 130. Within approximately 20-30 milliseconds after the DC voltage obtained from the rectified transmit audio signal exceeds the reference voltage, the threshold detector 130 will key the transmitter 112 and disable the first receiver 140. The output of the reference voltage generator 124 will then be reduced for allowing a continuous keying of the transmitter. Also, the one second time constant circuitry will enable the transmitter 112 to be continuously keyed even through normal speech pauses of up to one second in duration. Actuating the disable switch 40 will allow the operator to talk or cough without keying the transmitter. With this system, the transmitted audio signal will be free of most wind or ambient noise, and the voice actuated keying circuit will not be keyed falsely by the undesirable sounds. Also, the operator may actuate the switching circuit 160 for listening to a commercial broadcast station rather than the communications frequency.

It should be noted that the voice operated switching circuit may either be included as an integral part of the radio circuitry, or it may be constructed as a self-contained and self-powered unit for detachably coupling from and interfacing with several different radio units. It should be apparent at this point that a new and useful method and apparatus for controlling the operation of a communications transceiver have been described. The preferred embodiment of an apparatus for executing this process has been described merely as an example of the invention as claimed. However, the present invention should not be limited in its application to the details and construction illustrated in the accompanying drawings and specifications, since this invention may be practiced or constructed in a variety of other different embodiments. Also, it must be understood that the terminology and descriptions employed herein are used solely for the purpose of describing the general process and the preferred embodiment, and therefore should not be construed as limitations on the operability of the invention.

I claim:

1. An interface apparatus for controlling the operation of a communications transmitter/receiver type radio, said interface apparatus comprising in combination;
   a capacitance type contact vibration transducer responsive to vibrations in the frequency range of at least 500 to 2,000 Hz, coupled to the throat area of the communicator for generating a transmit audio signal being coupled to a modulator section of said communications transmitter/receiver for modulating the transmitter output;
   voice operated switching means for switching the transmitter/receiver into and out of the transmit mode responsive to receiving said transmit audio signal from said contact vibration transducer, whereby the operation of and the transmit signal from the transmitter/receiver type radio will be relatively impervious to the high ambient noise level;
   remote disabling means for generating a disable signal coupled to said voice operated switching means for disabling said voice operated switching means from switching said transmitter/receiver into said transmit mode;
   means, coupled to said contact vibration transducer, for generating a keying signal responsive to receiving said transmit audio signal therefrom with said keying signal generating means continuing to generate said keying signal for a predetermined period of time after the loss of said transmit audio signal; and
   keying means coupled to said keying signal generating means for switching the transmitter/receiver into the transmit mode responsive to receiving said keying signal, and for switching the transmitter/receiver into the receive mode responsive to one of the loss of said keying signal and receiving said disable signal from said disabling means.

2. The interface apparatus as described in claim 1 wherein said keying signal generating means comprises in combination:
   integrator means for producing a dc output voltage from an ac input representative of said transmit audio signal;
   an adjustable dc reference voltage source; and
   comparator means for generating said keying signal responsive to said dc output voltage from said integrator means exceeding said dc reference voltage.

3. The interface apparatus as described in claim 2 wherein said signal generating means further comprises feedback means for reducing the output of said dc reference voltage source responsive to said comparator means generating said keying signal.

* * * * *